F. N. CONNET.
DISPLACEMENT FLOAT FOR FLUID MEASURING DEVICES.
APPLICATION FILED JUNE 21, 1907.
1,063,186.
Patented June 3, 1913.
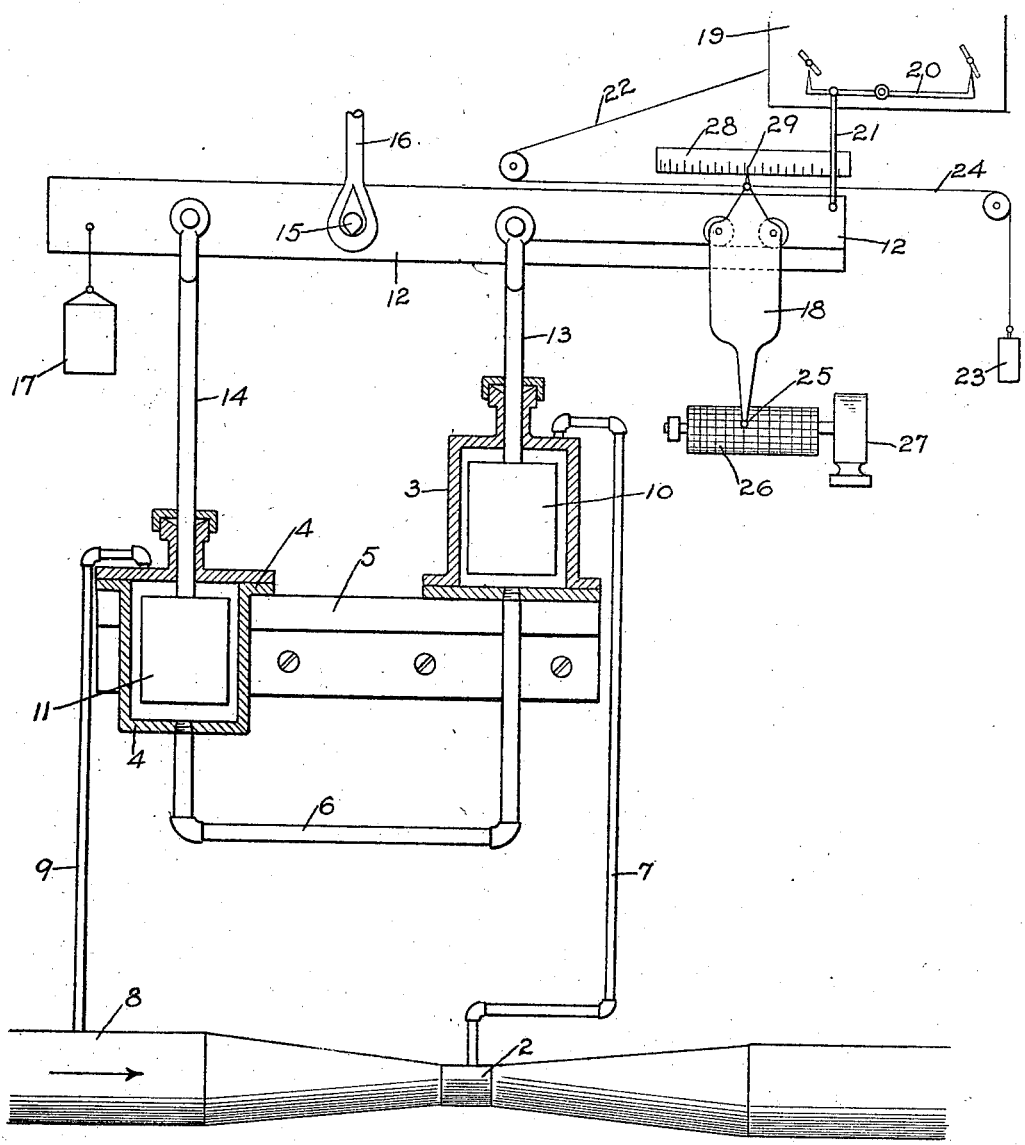
Witnesses
Robert E. Lanphear.
E. J. Ogden
Inventor
Frederick N. Connet.
By
Howard E. Barlow
Attorney

UNITED STATES PATENT OFFICE.

FREDERICK N. CONNET, OF PROVIDENCE, RHODE ISLAND.

DISPLACEMENT-FLOAT FOR FLUID-MEASURING DEVICES.

1,063,186.  Specification of Letters Patent.  Patented June 3, 1913.

Application filed June 21, 1907. Serial No. 380,046.

*To all whom it may concern:*

Be it known that I, FREDERICK N. CONNET, a citizen of the United States, residing at the city of Providence, in the county of Providence and State of Rhode Island, have invented certain new and useful Improvements in Displacement-Floats for Fluid-Measuring Devices, of which the following is a specification, reference being had therein to the accompanying drawing.

This invention relates to devices for measuring the flow of fluids passing through pipes, and especially to those devices that make use of floats for controlling the "means for showing the amount of flow." In devices of this character, it is customary to employ mercury for operating the floats as it is desirable to have the liquid many times heavier than the fluid to be measured. The high cost of mercury makes it desirable to so design the instrument that the amount of mercury used will be a minimum.

Instruments of this character which have heretofore been used generally have two receptacles in one or both of which are floats resting upon the surfaces of the mercury and as the surfaces rise and fall the floats also rise and fall, the depth of immersion of each float being constant. The floats are usually directly attached by rods, cords, links, or racks to the dials or other means for showing the amount of flow of the fluid to be measured, and as these showing mechanisms frequently require considerable power for their operation the diameter of the floats and therefore the quantity of mercury required is considerable. In my improved device, however, the float or floats do not rise and fall the same distance as the movement of the mercury surface, but the float or floats move only through a very small distance sufficient to release or set in motion a motor of some kind. This motor may be actuated by any well known means. The mechanism is so constructed that the movement of the motor varies the intensity of a vertical force or forces exerted upon the float or floats until such force or forces balances the buoyant forces exerted by the mercury under the float or floats.

The principal distinction between my present invention and those heretofore employed for this purpose is that in the older instruments the distance traversed by the surface of the mercury was the principal factor whereas in my present invention the upward force exerted against a body partially immersed is the principal factor. The old instruments were constructed to measure the distance. The new instrument is constructed to measure the intensity of a force.

The invention is fully set forth in this specification and more particularly pointed out in the appended claims.

The accompanying drawing is a diagrammatic view illustrating one arrangement of mechanism which may be actuated by the operation of my improved floats, the receptacles containing said floats being connected to the main supply pipe.

Referring to the drawings, at 1 is the main supply pipe having a contracted portion 2, the flow through said pipe being in the direction indicated by the arrow. The receptacles 3 and 4 are preferably held in a fixed position on the bracket 5 and communicate with each other through the pipe 6. Receptacle 3 is connected to the throat or reduced portion 2 by pipe 7, and receptacle 4 is connected with the main pipe 8 on the upstream side of the throat through the pipe 9. Located within these receptacles are the floats 10 and 11 which nearly fill said receptacles and are connected to the scale beam 12 through their respective connecting rods 13 and 14 whereby any movement of said floats either up or down will impart a corresponding movement to said scale beam, which is pivoted at 15 in the hanger 16. At one end of this beam is hung the weight 17 while at its opposite end is shown the counterbalance weight 18 which is adapted to be moved longitudinally along said beam at a given ratio to the vertical movement of said floats. This weight may be controlled in its movement by a motor of any desired construction, but I have illustrated the same as being controlled by a clock mechanism, the casing of which is shown at 19, which clock is in turn controlled in its movement by the raising and falling of the scale beam 12 which operates the escapement 20 through the connecting rod 21 whereby the clock is operated to wind up or unwind the cord 22 which is connected to the upper end of said counterweight, thereby winding the same up on a drum (not shown), drawing said weight to the left or unwinding the same so that it may be returned by means of the weight 23, which is connected to the opposite side thereof through the cord 24. At the lower end of this counterweight 18 is a recording pen 25 adapted to trace on the record sheet 26, which sheet is mounted on a suitable cylinder and rotated by the clock, not shown, mounted in the casing 27, whereby the rate of flow through the main pipe may be continually recorded. A scale 28 is also placed above the beam whereby the position of the pointer 29 on the said scale will indicate the rate of flow, or any other suitable means controlled by the intensity of said counterbalancing pressures may be employed for showing the flow through said main pipe.

The operation of the device may be more fully described as follows: The receptacles 3 and 4 jointly hold between them a quantity of mercury or other liquid, of greater specific gravity than the fluid to be measured. When there is no flow through the main all of this heavy liquid naturally stands in the lower receptacle 4. When the flow through the main pipe takes place the pressure at the throat 2 is reduced with reference to that at the point 8, therefore an amount of mercury in proportion to this differential pressure is forced from cylinder 4 to cylinder 3 and the floats in said cylinders fall and rise respectively. The action or buoyancy of each depends upon the depth to which the floats are immersed in the heavy liquid, and the depth to which each one is immersed depends upon the difference between the pressures at the two points in the main pipe. As this change takes place the upward movement of the float 10 and a corresponding movement of the other float in the opposite direction naturally raises the right end of the scale beam and causes the mechanism above described to move the counterweight a proportional distance to counterbalance the same, and when the flow in the main is decreased a reverse action of the mechanism takes place.

It will be seen that if one of the floats is detached from the scale beam the instrument will work precisely as before except that the force exerted on the scale beam will be only one-half as great as with two floats and therefore if one float is used its diameter would have to be greater than if two floats were used. The only advantage in using two floats is to make the utmost possible use of every pound of mercury.

My device is extremely simple in construction and by its use the desired effect is produced, and at the same time a large percentage of the expensive mercury heretofore required for the operation of measuring devices of this character is saved.

My invention is not restricted to the construction and arrangement of the parts herein shown and described nor to the various details thereof, as any displacement floats operated by a liquid of greater specific gravity than the fluid to be measured, and which depend for their action upon the depth at which they are immersed, will fall within the spirit and scope of my invention, one practical embodiment of which has been herein illustrated and described without attempting to show all of the various forms and modifications in which my invention might be embodied.

Having thus described my invention, what I claim as new and desire to secure by Letters Patent, is:

1. In a liquid measuring device, a main pipe, means in said pipe for producing a differential of pressure therein, two receptacles provided with means for establishing communication between them, and containing between them a liquid of greater specific gravity than the fluid to be measured, means for establishing communication between the respective receptacles and said pipe on opposite sides of the means for producing differential of pressure, a float in each receptacle, the volume of each float being nearly equal to the volume of its respective receptacle, a pivoted beam, connections between said floats and beam, a recording mechanism, and means controlled by the movement of said beam to operate said recording mechanism.

2. In a liquid measuring device, a main pipe, means in said pipe for producing a differential of pressure therein, two receptacles provided with means for establishing communication between them, and containing between them a liquid of greater specific gravity than the fluid to be measured, means for establishing communication between the respective receptacles and said pipe on opposite sides of the means for producing differential of pressure, a float in each receptacle, the volume of each float being nearly equal to the volume of its respective receptacle, a pivoted beam, connections between said floats and beam, a recording mechanism carried by one end of said beam, a counterweight carried by the opposite end of said beam, and means controlled by the movement of the beam to operate said recording mechanism.

3. In a liquid measuring device, a main pipe, means in said pipe for producing a differential of pressure therein, two receptacles provided with means for establishing communication between them, and containing between them a fluid of greater specific gravity than the fluid to be measured, means for establishing communication between the respective receptacles and on opposite sides of the means for producing differential of pressure, a float in each receptacle, the volume of each float being nearly equal to the volume of its respective receptacle, a pivoted beam free to move independently of said receptacles, connections between said floats and beam, a recording mechanism, and means controlled by the movement of said beam for operating said recording mechanism.

4. In a liquid measuring device, a main pipe, means in said pipe for producing a differential of pressure therein, two receptacles provided with means for establishing communication between them and containing between them a fluid of greater specific gravity than the fluid to be measured, means for establishing communication between the respective receptacles and said pipe, and on opposite sides of the means for producing differential of pressure, whereby the relative amounts of fluid in said receptacles are varied in accordance with the differential pressures in said pipe, a float in each receptacle, the volume of each float being nearly equal to the volume of its respective receptacle, a pivoted beam free to move independently of said receptacles, connections between said floats and beam, a recording device mounted on said beam, and means operated by said beam for controlling said recording device.

5. In a fluid measuring device, a main pipe, two receptacles, means for establishing communication between said receptacles, said receptacles containing between them a liquid of greater specific gravity than the fluid to be measured, means for connecting said receptacles with said pipe, a float in one of said receptacles, said float being of a volume nearly equal to the volume of the receptacle in which it is located, means supported independently of said float for counterbalancing the pressure exerted by and upon said float, and an exhibitor actuated by said counterbalancing means.

6. In a fluid measuring device a main pipe, two communicating receptacles provided with means for establishing communication between them, and containing between them a liquid of greater specific gravity than the fluid to be measured, means for connecting said receptacles with said pipe, a body in each receptacle, the volume of each of said bodies being nearly equal to the volume of its respective receptacle, and means for counterbalancing the differences in the pressures exerted by and upon said bodies, and an exhibitor actuated by said counterbalancing means.

7. In a fluid measuring device, a main pipe conveying the fluid to be measured, means for creating a difference of pressures at two points in said pipe, two receptacles provided with means in their upper portions for communicating with the two pressure points in said pipe, means for establishing communication between the lower portions of said receptacles, a float in each receptacle almost filling the latter, a liquid heavier than the fluid to be measured partially filling said receptacles and exerting upward pressures against said floats corresponding with the pressures in said pipe, means for exerting a downward counterbalancing pressure upon said floats, and means controlled by the intensity of said counterbalancing pressures for showing the flow through said pipe.

8. In a fluid measuring device, a main pipe conveying the fluid to be measured, means for creating a difference of pressures at two points in said pipe, two receptacles provided with means at their upper portions for communicating with the two pressure points in said pipe, means for establishing communication between the lower portions of said receptacles, a float in one of said receptacles almost filling the latter, a liquid heavier than the fluid to be measured partially filling said receptacles and exerting a pressure upwardly against said float dependent upon the flow through said pipe, means for exerting a downward counterbalancing pressure upon said float, and means controlled by the intensity of said counterbalancing pressure for showing the flow through said pipe.

In testimony whereof I affix my signature in presence of two witnesses.

FREDERICK N. CONNET.

Witnesses:
WM. R. TILLINGHAST,
E. I. OGDEN.